United States Patent
Beeken et al.

(10) Patent No.: US 9,760,449 B2
(45) Date of Patent: Sep. 12, 2017

(54) RESTORING A POINT-IN-TIME COPY

(71) Applicant: International Business Machines Corporation, Armonk, NY (US)

(72) Inventors: Christopher B. E. Beeken, Eastleigh (GB); Joanna K. Brown, Hampshire (GB); Carlos F. Fuente, Southampton (GB)

(73) Assignee: International Business Machines Corporation, Armonk, NY (US)

(*) Notice: Subject to any disclaimer, the term of this patent is extended or adjusted under 35 U.S.C. 154(b) by 19 days.

(21) Appl. No.: 14/855,440

(22) Filed: Sep. 16, 2015

(65) Prior Publication Data

US 2017/0075773 A1  Mar. 16, 2017

(51) Int. Cl.
*G06F 11/00* (2006.01)
*G06F 11/14* (2006.01)
*G06F 3/06* (2006.01)

(52) U.S. Cl.
CPC .......... *G06F 11/1469* (2013.01); *G06F 3/065* (2013.01); *G06F 3/0619* (2013.01); *G06F 3/0689* (2013.01); *G06F 11/1402* (2013.01); *G06F 11/1446* (2013.01); *G06F 2201/84* (2013.01)

(58) Field of Classification Search
CPC ............. G06F 11/1469; G06F 11/0727; G06F 11/073; G06F 11/1402; G06F 11/1446; G06F 11/1448; G06F 3/0619; G06F 3/065; G06F 3/0689; G06F 2201/84
USPC ..................... 714/15, 6.3, 6.32, 42
See application file for complete search history.

(56) References Cited

U.S. PATENT DOCUMENTS

| | | | | |
|---|---|---|---|---|
| 6,751,715 | B2* | 6/2004 | Hubbard | G06F 3/0601 |
| | | | | 707/999.202 |
| 6,983,295 | B1* | 1/2006 | Hart | G06F 11/1469 |
| | | | | 707/610 |
| 7,386,695 | B2 | 6/2008 | Fuente | |
| 7,979,735 | B2 | 7/2011 | Helman et al. | |
| 8,285,679 | B2 | 10/2012 | Agombar et al. | |
| 8,335,770 | B2 | 12/2012 | Merchant et al. | |
| 8,688,936 | B2 | 4/2014 | Agombar et al. | |
| 8,688,937 | B2 | 4/2014 | Agombar et al. | |

(Continued)

OTHER PUBLICATIONS

"FlashCopy mappings", http://pic.dhe.ibm.com/infocenter/flexsys/information/topic/com.ibm.acc., printed on Apr. 29, 2015, pp. 1-5.

(Continued)

*Primary Examiner* — Joseph D Manoskey
(74) *Attorney, Agent, or Firm* — David Zwick

(57) ABSTRACT

Managing storage volumes in a point-in-time copy cascade. The cascade includes a first source volume, a first point-in-time target volume, and a second point-in-time target volume. The second point-in-time target volume is a point-in-time copy of the first point-in-time target volume. Upon detecting a corruption of the first point-in-time target volume the method creates a third point-in-time target volume from the second point-in-time target volume and directs I/O operations for the first point-in-time target volume to the third point-in-time target volume. The first point-in-time target volume is restored to the second point-in-time target volume and, when the restoration is complete, deletes the first point-in-time target volume.

12 Claims, 14 Drawing Sheets

(56) References Cited

U.S. PATENT DOCUMENTS

| | | | |
|---|---|---|---|
| 8,719,523 B2 | 5/2014 | Beeken et al. | |
| 8,732,419 B2 | 5/2014 | Beeken et al. | |
| 8,793,453 B2 | 7/2014 | Agombar et al. | |
| 8,868,860 B2 | 10/2014 | Beeken | |
| 9,003,142 B2* | 4/2015 | Blea | G06F 3/0607 711/162 |
| 9,047,233 B2 | 6/2015 | Agombar et al. | |
| 9,069,711 B2 | 6/2015 | Agombar et al. | |
| 2006/0047926 A1* | 3/2006 | Zheng | G06F 3/0608 711/162 |
| 2009/0319735 A1 | 12/2009 | Agombar et al. | |
| 2010/0332889 A1 | 12/2010 | Shneorson et al. | |
| 2011/0055505 A1 | 3/2011 | Agombar et al. | |
| 2012/0079224 A1 | 3/2012 | Clayton et al. | |
| 2013/0080695 A1* | 3/2013 | Beeken | G06F 3/065 711/112 |
| 2013/0346710 A1 | 12/2013 | Agombar et al. | |
| 2013/0346712 A1 | 12/2013 | Agombar et al. | |
| 2014/0189233 A1 | 7/2014 | Agombar et al. | |
| 2014/0215262 A1* | 7/2014 | Li | G06F 11/0727 714/6.21 |

OTHER PUBLICATIONS

IBM Corp., "Snapshots Reinvented", IBM XIV Storage System White Paper, Sep. 2008, pp. 1-17.

Mell et al., "The NIST Definition of Cloud Computing", National Institute of Standards and Technology, Special Publication 800-145, Sep. 2011, pp. 1-7.

IBM, List of IBM Patents or Patent Applications Treated as Related, Appendix P, dated Apr. 17, 2017, 2 pages.

Pending U.S. Appl. No. 14/855,435, filed Sep. 16, 2015, entitled: "Point-In-Time Copy Restore", 60 pages.

Pending U.S. Appl. No. 14/855,451, filed Sep. 16, 2015, entitled: "Restoring A Cline Point-In-Time Copy", 72 pages.

* cited by examiner

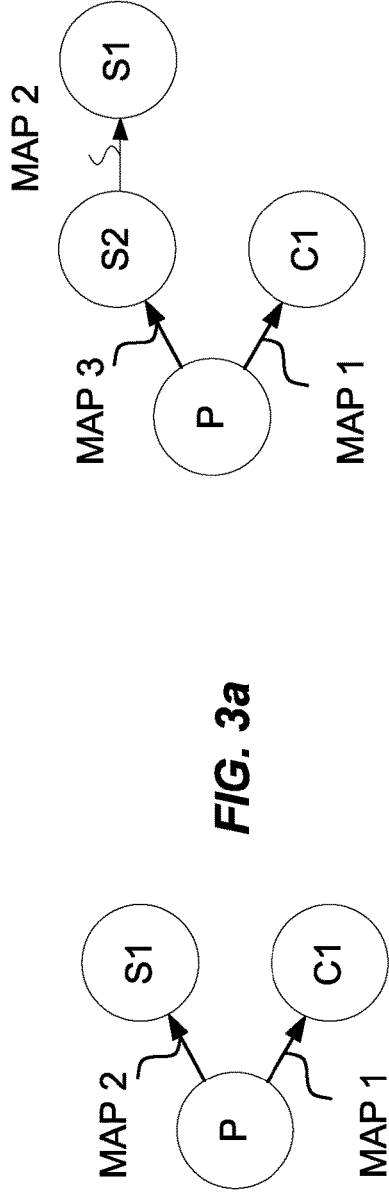
FIG. 3a
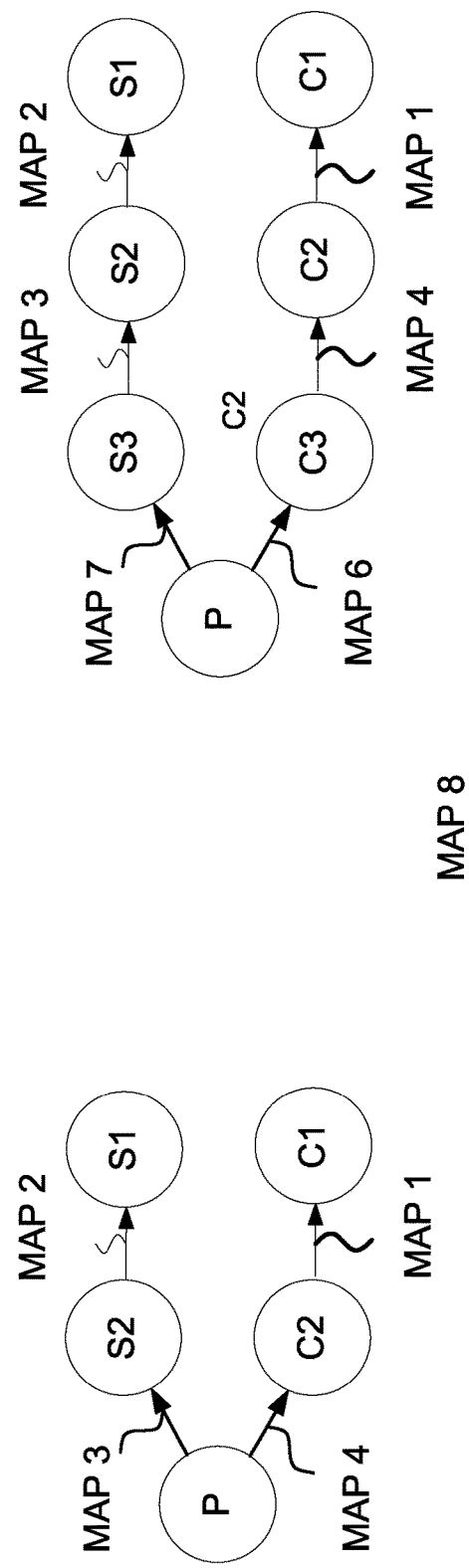
FIG. 3b
FIG. 3c
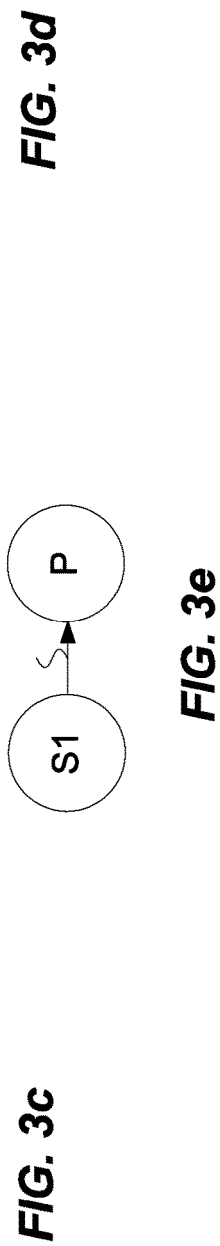
FIG. 3d
FIG. 3e

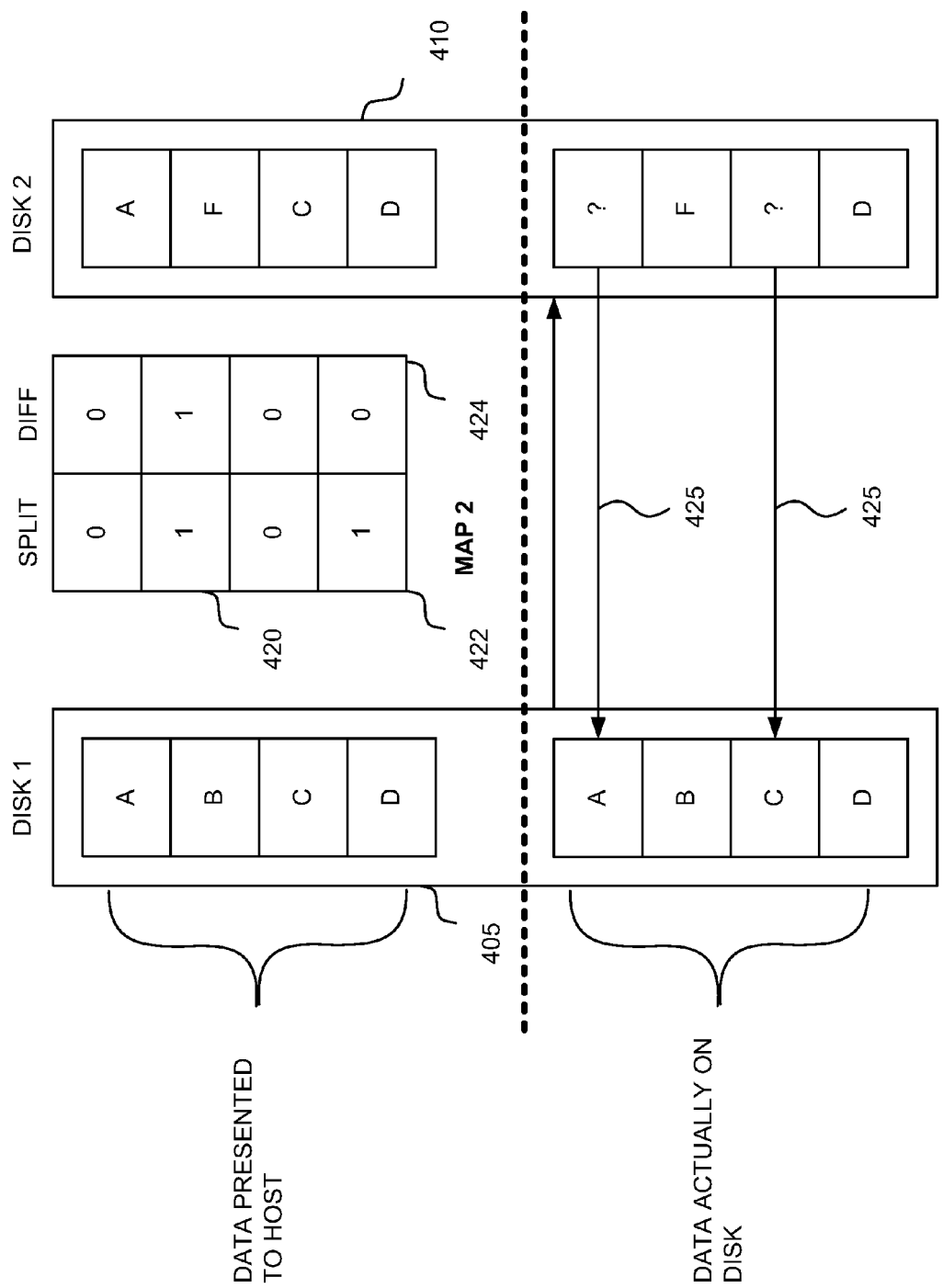

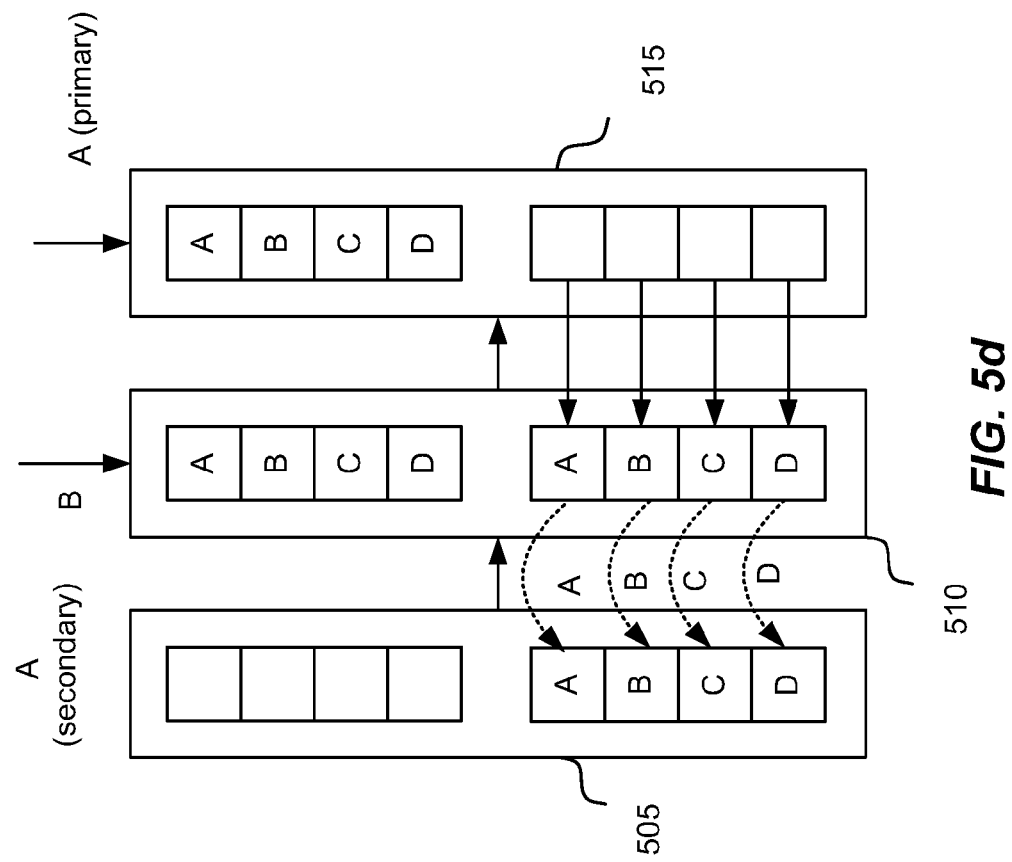
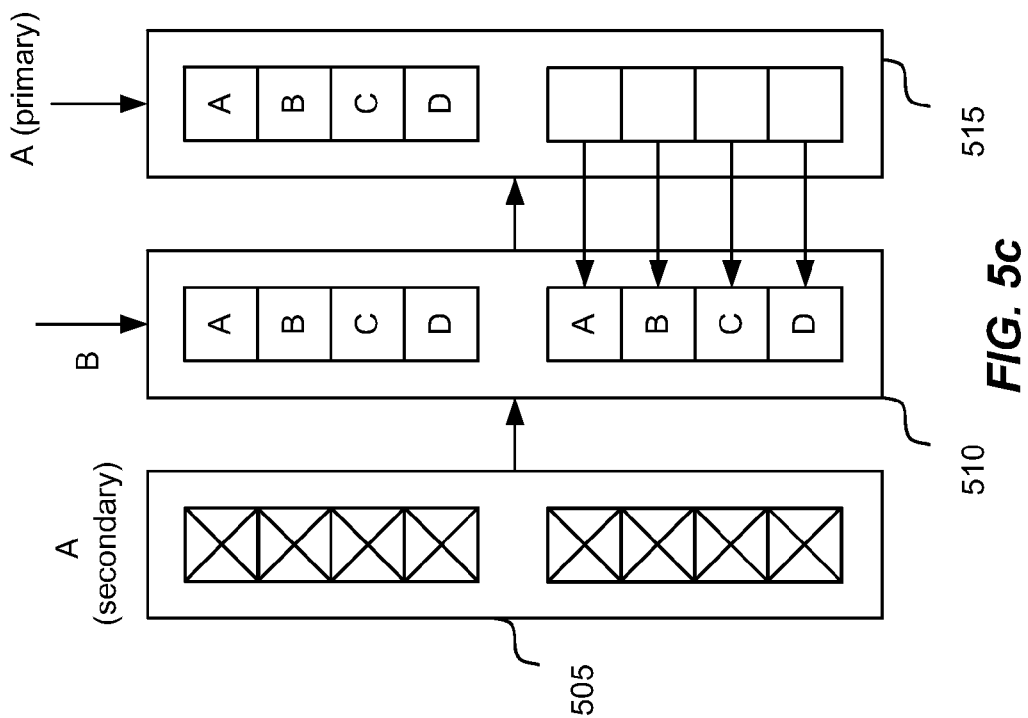
FIG. 5d
FIG. 5c

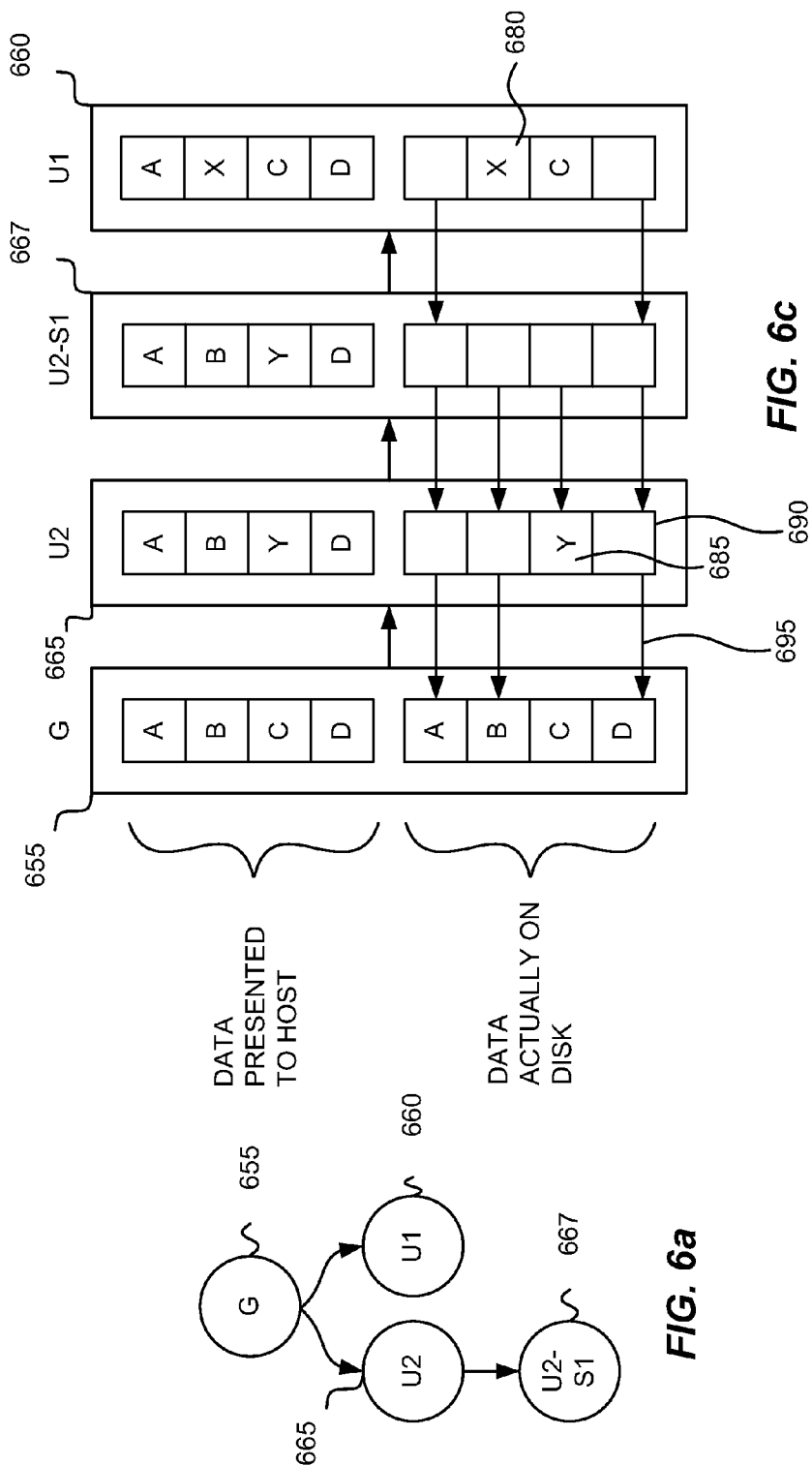
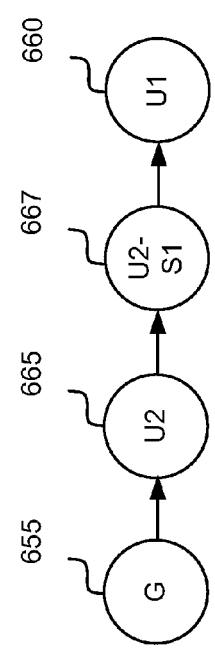
FIG. 6c
FIG. 6a
FIG. 6b

RESTORING A POINT-IN-TIME COPY

BACKGROUND

The present invention relates to the field of computer storage systems, and particularly to advanced function storage systems providing a point-in-time copy function.

In the field of computer storage systems, there is increasing demand for what have come to be described as "advanced functions." Such functions go beyond the simple input/output (I/O) functions of conventional storage controller systems. Advanced functions are well known in the art and depend on the control of metadata used to retain state data about the real or "user" data stored in the system. The manipulations available using advanced functions enable various actions to be applied quickly to virtual images of data, while leaving the real data available for use by user applications. One such well-known advanced function is point-in-time copy. An example of point-in-time copy is IBM® FlashCopy®. IBM, and FlashCopy are trademarks of International Business Machines Corporation.

Point-in-time copy is a feature supported on various storage devices that allows nearly instantaneous point-in-time copies of entire logical volumes or datasets to be made. The point-in-time function enables one to make full volume copies of data, with the copies immediately available for read or write access. The copy may be used with standard backup tools that are available in a computing environment to create backup copies on tape.

Snapshot is a common industry term denoting the ability to record the state of a storage device at any given moment and preserve that snapshot as a guide for restoring the storage device in the event that it fails. A snapshot primarily creates a point-in-time copy of the data. Typically, snapshot copy is done instantly and is made available for use by other applications such as data protection, data analysis and reporting, and data replication applications. The original copy of the data continues to be available to the applications without interruption, while the snapshot copy is used to perform other functions on the data.

A snapshot is a point-in-time copy that is dependent on a primary disk. A snapshot may, for example, be accomplished using a copy-on-write procedure, in which currently existing data in a region on the primary disk is written to a backup disk when a write is being made to the region on the primary disk. Thus, the backup disk will contain data that has been overwritten on the primary disk, as opposed to a complete copy of the primary disk. This type of backup copy typically results in a thinly-provisioned volume, which reduces storage. A series of snapshot copies may be cascaded together to represent the primary disk at various times. However, the snapshot copies typically remain dependent on the primary disk to reassemble a complete copy of the primary disk. Therefore, a snapshot is a point-in-time copy where the target only holds the changed data necessary to present the point-in-time copy of the source. Data is only copied to the target disk if it is changed on the source. The target disk is generally always dependent on some of the data on the source disk in order to present the point-in-time copy.

In contrast, a clone is a point-in-time copy that is independent of the primary disk. A clone may, for instance, be created by executing a background copy procedure in which a disk's regions are sequentially copied to the backup disk and executing a copy-on-write procedure to immediately copy any primary disk regions that are about to be overwritten due to a write and have not yet been processed by the background copy procedure. A clone is typically used when a copy is needed and I/O to the copy must not impact I/O to the primary volume in any way. A clone may also be used when the copy is not to be affected by availability to the source. A clone may also be used in a cascade.

Therefore, a clone is a point-in-time copy where the target disk will hold a complete copy of the data that was on the source disk when the point-in-time copy was started. When the copying of the data from source to target completes, the target disk is independent of the source.

Prior art solutions provide solutions for a first restoration of a source disk from a point-in-time copy, for example, a snapshot point-in-time copy. However, these solutions are not appropriate if the volume to be restored is itself a point-in-time copy of another volume.

SUMMARY

Embodiments of the present invention disclose a computer-implemented method, system, and computer program product for managing storage volumes in a point-in-time copy cascade. The cascade includes a first source volume, a first point-in-time target volume, and a second point-in-time target volume. The second point-in-time target volume is a point-in-time copy of the first point-in-time target volume. The method detects a corruption of the first point-in-time target volume, creates a third point-in-time target volume from the second point-in-time target volume, and directs I/O operations for the first point-in-time target volume to the third point-in-time target volume. The method restores the first point-in-time target volume to the second point-in-time target volume and, when the restoration is complete, deletes the first point-in-time target volume.

BRIEF DESCRIPTION OF THE DRAWINGS

FIGS. 3a-3e depict point-in-time copy mappings, in accordance with an exemplary embodiment of the present invention.

FIG. 4 depicts an exemplary cascade of a map, in accordance with an exemplary embodiment of the present invention.

FIGS. 5a-5d depict a method to recover from a corruption, in accordance with an embodiment of the present invention.

FIGS. 6a-6c depict a source disk with point-in-time copies, and mappings used in recovery of a point-in-time copy, in accordance with an embodiment of the present invention.

DETAILED DESCRIPTION

Figure 1:
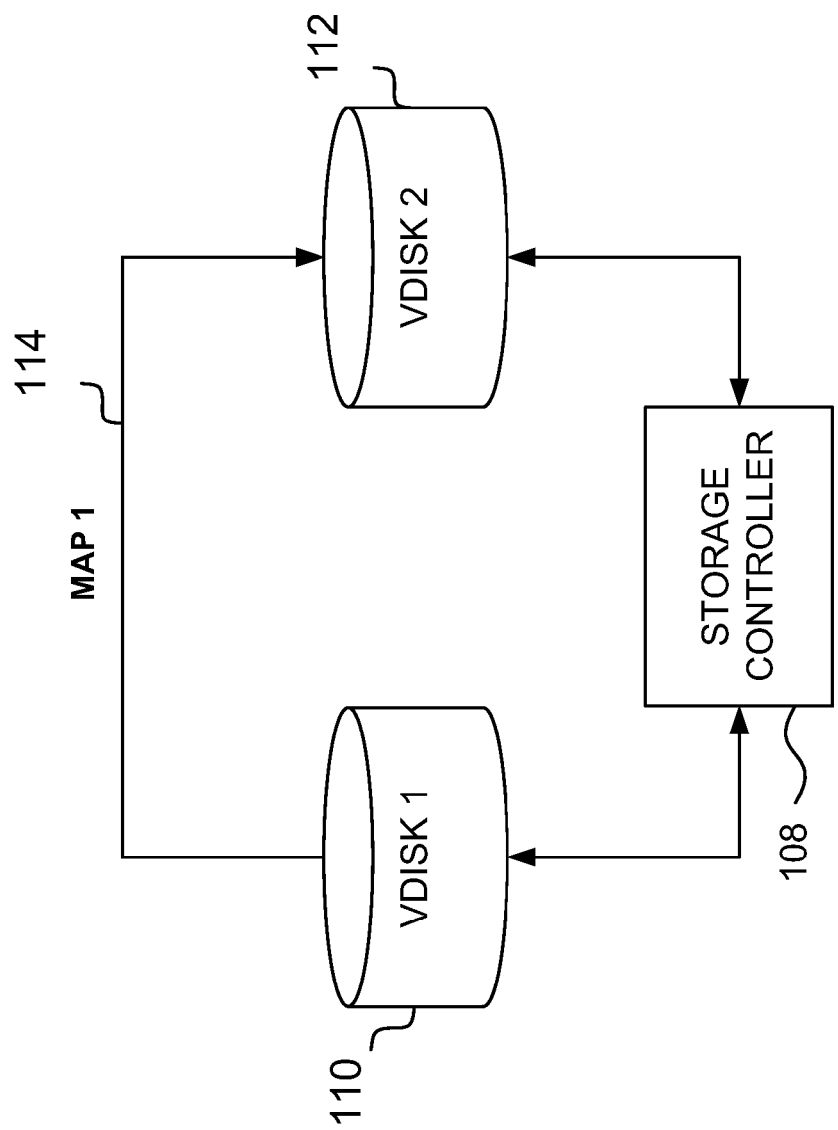
FIG. 1 depicts a backup process using a storage controller and two storage disks, in accordance with an exemplary embodiment of the present invention.

Point-in-time copies may be used in cascaded implementations, in which a target disk later becomes the source disk for a further point-in-time copy, or vice versa. A cascaded configuration of storage volumes is described in detail in U.S. Pat. No. 7,386,695 B2, which describes an algorithm for implementing point-in-time copy functionality that optimizes source writes at the expense of target I/O. This has the advantage of allowing unlimited point-in-time copy images to be created from a single source while bounding the additional I/O required to maintain the point-in-time copies to an additional read and write.

U.S. Pat. No. 7,386,695 B2 (Fuente, Carlos F. "Storage System with Multiple Copy Targeting", Jun. 10, 2008), incorporated herein by reference in its entirety, discloses a storage controller, co-operable with a host computer apparatus, and a plurality of controlled storage apparatus, comprising a host write component operable to write a data object to a source data image at one of the plurality of controlled storage apparatus; a first copy component responsive to a first metadata state and operable to control copying of the data object to a first target data image at one of the plurality of controlled storage apparatus; a second storage copy component responsive to a second metadata state and operable to perform one of: controlling copying of the data object to a second target data image at one of the plurality of controlled storage apparatus; and causing the first copy component to perform copying of the second target data image to the first target data image.

U.S. Pat. No. 8,688,937 B2 (Agombar, John P. et al "Method for Optimizing Cleaning of Maps in FlashCopy Cascades Containing Incremental Maps", Apr. 1, 2014), incorporated herein by reference in its entirety, discloses a method for optimizing cleaning of maps in point-in-time copy cascades, including determining whether a target disk of a map contains data unavailable to a downstream disk from an upstream disk in a cascade, and detects whether a downstream disk has a copy of the data.

U.S. Pat. No. 8,793,453 B2 (Agombar, J. P. et al "Multiple Cascaded Backup Process", Jul. 29, 2014), incorporated herein by reference in its entirety, discloses handling a backup process. An instruction initiates a new backup from a source volume to a target volume using one a plurality of backup processes.

U.S. Pat. No. 8,868,860 B2 (Beeken, C. "Restore in Cascaded Copy Environment", Oct. 21, 2014), incorporated herein by reference in its entirety, discloses handling of multiple backup processes comprising detecting that a defined storage volume is present in a first cascade of storage volumes; detecting that the defined storage volume is present in a second cascade of storage volumes; receiving a data write for a last storage volume in the first cascade of storage volume; and performing a cleaning data write on the defined storage volume in the second cascade of storage volumes, wherein the cleaning data write corresponds to the received data write.

When a point-in-time copy operation is initiated, a point-in-time relationship is created between the source volume and the target volume. Thus, a point-in-time relationship is a mapping of the point-in-time source volume and the point-in-time target volume. This mapping allows a point-in-time copy of that source volume to be copied to the associated target volume. The point-in-time relationship exists between this volume pair from the time that a point-in-time operation is initiated until the storage unit copies all data from the source volume to the target volume or until the point-in-time relationship is deleted. Moreover, a cascaded point-in-time configuration is one where the source disk of one map is the target disk of another map. For example, there may be one map defined with source disk A and target disk B, and another map defined with source disk B and target disk C. The cascade would include the three disks A, B and C and the two maps. Once the copies are made, the copies are immediately available for both read and write access.

When the data is physically copied, a background process copies tracks or grains from the source volume to the target volume. The amount of time that it takes to complete the background copy depends on, for example, the amount of data being copied, the number of background copy processes that are occurring, and the other activities that are occurring on the storage system, among other factors.

When a point-in-time operation copies data from a source volume to a target volume, that source volume can be involved in more than one point-in-time relationship at the same time (known as a multiple relationship point-in-time). That is, the multiple relationship point-in-time function allows a source volume to have multiple targets simultaneously. If a track on a volume is not a target track of an existing point-in-time relationship, it can become the target in a new point-in-time relationship.

Thus, for example, if multiple copies of the same data are required, this multiple relationship point-in-time function allows a single source volume to be copied multiple times to different target volumes as soon as a point-in-time volume is established. For example, suppose a point-in-time is used to copy volume A to volume B. As soon as that point-in-time relationship is established, volume A may be copied to volume C. Once that relationship is established, volume A may be copied to volume D, and so on. Additionally, multiple sessions within a single volume are possible.

A cascade may be used to implement multiple point-in-time copies of a single data source. For example, with a data source P and point-in-time copies of P taken at times t1, t2 and t3, then at time t1 there is taken a point-in-time copy using data target T1 resulting in a cascade: P→T1. Then at time t2 there is taken a second point-in-time copy using data target T2 and resulting in the cascade: P→T2→T1. In effect, T1 is established as a copy of T2, which is at this instant identical with P, and T2 is a copy of P. A bitmap held by T2 that describes its differences from P also correctly describes its difference from T1. Updates to P only require a copy operation to copy from P to T2. Conversely, updates to T2 require two copy operations: from P to T2, and from T2 to T1. This is because updates to the middle of a chain force a copy to the relationships on either side. Adding a third backup T3 at t3 produces the cascade: P→T3→T2→T1.

This technique has many benefits. However, it also introduces dependencies between the data targets that may not exist in a traditional multiple target implementation. A side effect of this target dependency can be a requirement to "clean" a target when a point-in-time copy is stopped or completes. For example, if point-in-time copy P→T2 is stopped, any data on T2 that is required by T1 is typically copied from T2 to T1 before the target T2 can be removed from the cascade. In many situations this is not a problem, because the user may wish T1 to hold a complete copy of P at time t1, meaning that the backup process P→T1 is a clone. However, if the intention of P→T1 is just to produce a snapshot of P at time t1, this extra copying from T2 to T1 may cause the user problems. Further, if the data target T1 was thinly provisioned (also known as space efficient), the problems caused by the above behavior may cause the unnecessary allocation of storage to T1. In some applications this may reduce the user's ability to maintain snapshots and clones and to manage their backups.

There are a number of existing techniques that attempt to reduce the amount of data that is copied in a cleaning from one volume to another, such as from T2 to T1, with varying degrees of success. However, many such solutions can dramatically increase the amount of metadata used to track the contents of the various data targets.

Multiple target point-in-time copying, when implemented using a cascade methodology, offers great scalability in terms of number of copies while also giving the user the ability to make copies of copies. However, multiple target point-in-time when implemented using a cascade methodology also introduces the undesirable concept of having to clean a point-in-time map before it can be removed from a cascade. The cleaning process ensures that no disk in the cascade is dependent on the target disk of the map being removed. The cleaning process can take a considerable amount of time to complete.

Additionally, point-in-time may utilize space-efficient volumes. The point-in-time space-efficient feature allocates storage space on an as-needed basis by using space on a target volume only when it actually copies tracks or grains from the source volume to the target volume. Without space-efficient volumes, the point-in-time function requires that all the space on a target volume be allocated and available even if no data is copied there. However, with space-efficient volumes, point-in-time uses only the number of tracks or grains that are required to write the data that is changed during the lifetime of the point-in-time relationship, so the allocation of space is on an as-needed basis. Because space-efficient point-in-time volumes do not require a target volume that is the exact size of the source volume, the point-in-time space-efficient feature increases the potential for a more effective use of system storage.

The space-efficiency attribute may be defined for the target volumes during the volume creation process. A space-efficient volume can be created from any extent pool that has already-created space-efficient storage. As long as the space-efficient source and target volumes have been created and are available, they can be selected when the point-in-time relationship is created.

Thus, as described above, the point-in-time space-efficient feature increases the potential for a more effective use of system storage. However, combining multiple target point-in-time with space efficient volumes adds another problem to the cleaning process. That is, consider the situation where a customer has a daily backup copy, wherein every day, for example, the customer makes a new space efficient copy of this backup. Cascade and multiple target point-in-time and space efficient volumes enables this setup. Also, consider that in order to reduce time taken to complete the daily backup, the point-in-time map is made incremental. The problem with the cleaning process in this scenario is that the cleaning process will need to copy all the data from the daily backup to the latest space efficient copy. However, since the daily copy is a complete copy this will require that the whole of the space efficient copy will be allocated. Thus, with this scenario, the utilization of the space efficient volume is "broken" by the cascaded cleaning methodology.

There are two significant algorithms used to implement point-in-time solutions, these are redirect-on-write (ROW) and copy-on-write (COW). Details of both these algorithms can be found from many openly available sources.

Both ROW and COW have advantages and disadvantages for the implementer and ultimately the user of the resulting product. ROW can be more efficient in terms of write I/O overhead because the new write data is written to a new region rather than having to move the existing data prior to applying the write data. It is also the case that many advanced features such as revert/restore are simpler in ROW environments. A disadvantage of ROW over COW is that the data for all the images must usually be from a single storage pool. This means that ROW will often be optimal for the snapshot version of a point-in-time copy. Whereas the clone and backup cases often require the point-in-time copy to be in a separate storage pool, making COW the better algorithm.

Prior art solutions show how to perform many point-in-time copies of a single volume with the cost being independent of the number of such copies. Chaining of related point-in-time copies is allowed. Such an algorithm optimizes the standard copy-on-write algorithm, but it still requires additional I/O that would not be required by a ROW implementation. This I/O comes in the form of the split write required to maintain the latest point-in-time image.

There would be an advantage to have an algorithm which provides the flexibility of prior art solutions in providing point-in-time copy images across multiple storage pools, but also provides the write I/O efficiency of ROW algorithms for snapshots where the storage is all in one pool.

Some storage controllers allow a user to configure more than one target for a given source. This has a number of applications. For instance, different experiments could be run against each of the targets. Or the targets might be taken at different times (e.g., different days in the week), and allow historical access to the disk, perhaps for the purpose of recovering from some data corruption, such as might be caused by a virus.

FIG. 1 depicts a backup process using a storage controller 108 and two storage disks 110, 112. The disks 110 and 112 could form part of a larger array of disks, and may form part of an enterprise storage solution. The disks 110 and 112 could be part of a storage solution relating to a commercial website, for example. If at any time a backup needs to be made of the content of vdisk1, then a point-in-time copy instruction can be sent from the storage volume controller 108 to that disk 110, which defines a source disk 110 (vdisk1) and also a target disk 112 (vdisk2), which is the target of the point-in-time copy. The point-in-time copy instruction creates a point-in-time copy of the image of the specific vdisk which is the source disk 110.

In the embodiment of FIG. 1, the source disk 110 of a first point-in-time copy instruction is vdisk1 110, and the target disk 112 is vdisk2 112. The point-in-time copy instruction starts the point-in-time copy process, which creates a map 214 from the source disk 110 to the target disk 112. This map is labelled MAP 1 in FIG. 1. The image of vdisk1 at this specific point in time is now available on vdisk2. This creates a backup of the data on vdisk1, and also allows tests and other administration tasks to be run on the data of vdisk1, without the attendant danger of losing any of the original data, as it is preserved on the original source disk.

When a point-in-time copy is made, it creates a link between the two disks 110 and 112, as defined by the map 114. Data may now be copied across in the background, with the additional requirement that any access to vdisk2 (as the target disk 112) may immediately cause the relevant parts of the image of vdisk1 to be copied across, and also any access to vdisk1 which would result in a change to the image stored by that disk 110 will also cause the unaltered data to be immediately copied across to the target disk 112, prior to the change being made. In this way, the vdisk2, to an outside user, stores the point-in-time copy of vdisk1, although data may only be physically copied across under the circumstances described above.

A storage volume that is the target volume of a backup process such as a point-in-time copy function can also be the source volume of a further backup process, thus creating a cascade of storage volumes.

Figure 2:
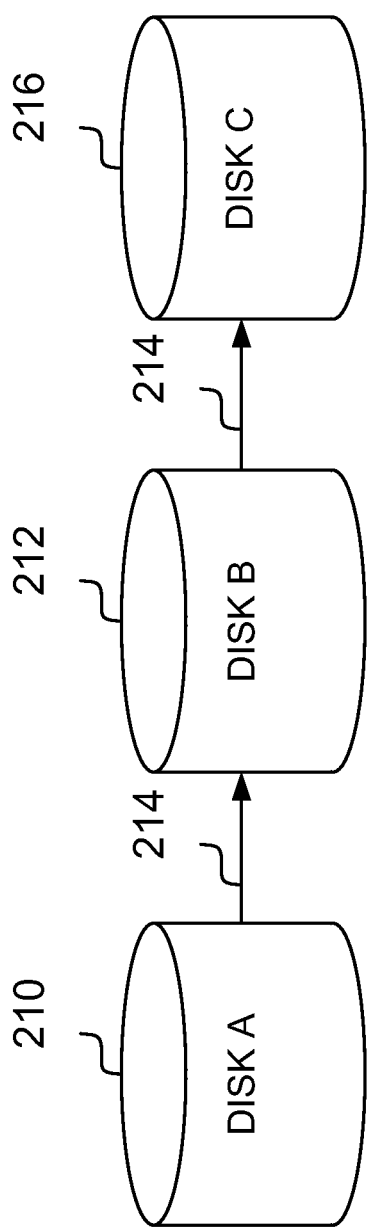
FIG. 2 depicts an example of a point-in-time copy cascade of three storage volumes, which are linked by point-in-time copy maps, in accordance with an exemplary embodiment of the present invention.

FIG. 2 depicts an example of a point-in-time copy cascade of three storage volumes 210, 212 and 216, which are linked by point-in-time copy maps 214. Each map 214 defines a backup process from a source volume to a target volume. Disk B is providing a backup of disk A 210, and disk C 216 is also providing a backup of disk A 210, through disk B 212. The point-in-time copy functions linking the different storage volumes may have been started at different times, which create different point-in-time copies of the images stored by the respective storage volumes, or could have been started simultaneously.

In the point-in-time copy cascade of A→B→C, where A 210, B 212 and C 216 are the disks in the cascade, as shown in FIG. 2, and the arrows are the point-in-time copy maps 214, then denoting (A, B) to be a point-in-time copy mapping from disk A 210 to disk B 212, the cascade has maps (A, B) and (B, C). In this implementation of the cascade, any new data write to disk A 220 will cause a write, that is a "copy write", to disk B 212, as per the respective point-in-time copy function, which is required to maintain the image on disk B 212. This writing to disk B 212 will cause a further read, often referred to as a "clean read," of disk B 212 followed by another copy write to disk C 216. In this way a single write to the first storage volume 210 in the cascade can result in a number of I/O cleaning operations throughout the cascade.

When a cascade is created, the new maps and new storage volumes are inserted into the cascade, not added to the end of the cascade. In the cascade shown in FIG. 2, the first backup process started would be A→C. When the backup process A→B is then started, the new target storage volume B 212 is effectively inserted between the existing source storage volume A 210 and the existing target storage volume C 216. This insertion is purely a logical construction illustrating the fact that target disk C 216 will receive data writes from disk B 212, rather than disk A 210. This is how a cascaded implementation differs from a conventional arrangement which would have two independent maps from disk A 210.

The storage controller 108 may be operated so that the disks and maps are arranged so that clones and snapshots are separated into different dependency chains or cascades. As described in greater detail below, one feature of separating clones and snapshots into different cascades is to reduce or eliminate cleaning operations caused by termination of a copying operation.

FIGS. 3a-3e depict point-in-time copy mappings, in which an exemplary embodiment of the present invention may be implemented. For example, within the context of the present description, Map 1 of FIG. 3a is started as a clone and later Map 2 is started as a snapshot. The resulting graph structure for the source volume P, the clone volume C1, and the snapshot volume S1, and used to maintain the target images, would be as depicted in FIG. 3a. This structure is a dependency graph.

In the graph shown in FIG. 3a, a data write to disk P may require copy-on-writes to C1 and/or S1 in order to maintain those images on the target disks of the respective backup processes. If the storage volume controller 108 starts Map 3, as a snapshot, the resulting dependency graph is as depicted in FIG. 3b. In a cascade, the new disk and map to that disk may be placed adjacent to the source disk P, so the new target disk S2 of Map 3 is placed in cascade P→S2→S1, where the two maps, Map 3 and Map 2 are both snapshots. In the separate cascade P→C1 Map 1 is a clone.

Subsequent backup processes as either snapshots or clones of P extend the length of the clone and/or snapshot chains without increasing the number of edges leaving P and so do not increase the number of cleaning operation I/Os associated with a write to P. The graph of FIG. 3b can be extended to include further snapshots and clones. To maintain cascade type separation, if a cascade exists for the specific backup process type (clone or snapshot), then the target storage volume is added to the existing cascade for the identified backup process type, or if a cascade does not exist for the identified backup process type, then a new cascade is started, which consists of the target storage volume and the source storage volume. In this way clones and snapshots taken from specific source disks do not appear in the same cascade from that specific source disk.

FIG. 3c depicts the logical arrangement of the storage volumes after further backup C2 has been taken. If the storage volume controller 108 starts Map 4 as a clone, the resulting dependency graph is as depicted in FIG. 3c. In a cascade, the new disk and map to that disk are placed adjacent to the source disk P, so the new target disk C2 of Map 4 is placed in cascade P→C2→C1, where the two maps, Map 4 and Map 1, are both clones. In the separate cascade P→S2→S1, the two maps, Map 3 and Map 2, are both snapshots.

FIG. 3d depicts the logical arrangement of the storage volumes after further clone and snapshot backups C3 and S3 have been taken. The storage volume controller 108 starts Map 6 as a clone and Map 7 as a snapshot, the resulting dependency graph is as depicted in FIG. 3d. In a cascade, the new disk and map to that disk are placed adjacent to the source disk P, so the new target disk C3 of Map 6 is placed in cascade P→C3→C2→C1 (FIG. 3d), where the three maps, Map 6, Map 4 and Map 1, are each clones. The new target disk S3 of Map 7 is placed in cascade P→S3→S2→S1 (FIG. 3d), where the three maps Map 7, Map 3 and Map 2 are each snapshots.

The order in which the different types are taken can be any permutation of S1, S2, S3, C1, C2, C3 provided the snapshots are in the correct order relative to the other snapshots and the clones are in the correct order relative to other clones. For example, the start order could be S1, C1, S2, S3, C2, C3. These cascades can be considered as forming a tree with root node P as shown in FIG. 3d.

As per the respective point-in-time copy function with multiple target point-in-time copies, writes to a disk in a dependency graph would result in a read, split writes and a client write to maintain the other images on the disks. For example, a client (or host) write to P in the above dependency graph may result in 1) a read, that is, a read of P, if the data is required by S3 or C3 for the location being written to is on P, 2) a split write, that is a) a write to S3 of the data read from P, if S3 is dependent on P, and b) a write to C3 of the data read from P, if C3 is dependent on P (which can be performed in parallel to the second action), and 3) a client write, that is, the client write itself to P. As a result of these cleaning operations for each write to P, the volumes S3 and C3 are each independent of any grains changed since those backups were started.

One feature of separating clones and snapshots into different cascades is to facilitate termination of unnecessary backups to reduce or eliminate cleaning associated with the stop itself. For example, if Map 4 is stopped in the dependency graph of FIG. 3d, the storage volume controller 108 will clean the data from C3 to C1. This may not be considered to be an added cleaning operation because C1 is also a clone and the data is intended to be copied onto it. The snapshots S3, S2, S1 are not affected.

Conversely, when a snapshot is stopped, all snapshots and clones of the target snapshot disk may be readily stopped due to the separation from the clone cascades without additional cleaning resulting from the stop. Furthermore, when a clone is stopped all snapshots of the target clone disk may also be stopped. This approach may be taken because a snapshot is typically dependent on its source. Consequently, if the clone source of a snapshot is destroyed, the dependent snapshot is likely of little or no use. In this manner, by separating clones and snapshots into different cascades, additional cleaning operations can be reduced or eliminated.

If it is now discovered, for example, that disk P is corrupt and the administrator wishes to restore disk P from an existing disk such as disk S1, for example, there is created and started a Map 8, S1→P, which results in cascade S1→P (FIG. 3e). Using a separate cascade for the restore operation would result in three separate cascades. For instance, restoring P from S1 would result in cascades P→S3→S2→S1 and P→C3→C2→C1 (FIG. 3d) and S1→P (FIG. 3e). Restoration of disk P is described below with reference to FIGS. 4, 5a, 5b, 5c, and 5d.

The system also allows a disk to exist a number of times in the same cascade or in separate cascades. As an example, S3, S2 and S1 are created as snapshots of P. S1 contains the user's original data, whereas S3 and S2 contain further snapshots on which two different simulations have been run. The user may decide that the result of the simulation on S2 is beneficial and decides to restore P from S2. The system allows for the user to start a new map S2→P while still maintaining the unmodified backup of the original data in S1.

However, the more times that a disk appears in a cascade the more I/O operations may be required at the point-in-time copy level (cleaning I/Os) before a host originated I/O can be completed back to the host. Alternatively, to reverse a map, an administrator can simply create and start a map 214 in the opposite direction.

FIG. 4 depicts an exemplary cascade of a map, in accordance with an exemplary embodiment of the present invention. More specifically, FIG. 4 depicts representations of two disks 405, and 410. As depicted in FIG. 4, the upper portions of the disks indicate data that is presented to, e.g., a host, from the respective disks. The disk as presented to a host is referred to as the vdisk. A vdisk is a term used in storage virtualization to signify a virtual logical disk or volume with which a host computer or host computer application performs I/O operations. FIG. 4 also depicts the lower portions of the representations of the disks indicating the data that is actually contained on the respective disks. These lower portions of the disk are referred to as the pdisk. The pdisk is an object that is directly connected to physical storage. The skilled person would understand that the pdisk may itself be a virtual volume sitting on a Redundant Array of Independent Disks (RAID) array(s). The skilled person would also appreciate that the storage controller 108 manages the copies at a virtual level, but that reads and writes to logical disks do result in reads and writes, respectively, to physical disks. Thus, Disk 1 405 presents four grains (or tracks) of data A, B, C, D to a user and actually has those grains A, B, C, D stored on Disk 1 405. In contrast, Disk 2 410 presents four grains of data A, F, C, D to a user. However, as shown in the bottom portion of Disk 2 410, Disk 2 410 actually only has stored thereon grains two and four (F and D, respectively) and relies upon data stored in Disk 1 405 to present the host with grains A and C. The fourth grain (D) is stored on Disk 2 410, even though the same data is available on Disk 1 405, due, for example a rewrite of data D onto Disk 1 405 previously.

As additionally depicted in FIG. 4, Map 2 420 is an incremental map between Disk 1 405 and Disk 2 410. That is, Map 2 420 includes a split bitmap (split) 422 and a difference bitmap (diff) 424. According to embodiments of the invention, the split bitmap 422 is used in a point-in-time process to track the location of the data. More specifically, a "0" in the split bitmap 422 indicates that the data is located on the source disk and a "1" in the split bitmap 422 indicates that the data is located on the target disk. Furthermore, the difference bitmap 424 is used in a point-in-time copy process to track the differences between the source and target disks, e.g., virtual disks. More specifically, a "0" in the difference bitmap 424 indicates there is no difference between the data located on the source disk and the target disk, and a "1" in the difference bitmap 424 indicates that there is a difference between the data located on the source disk and the data located on the target disk.

Thus, referring to the example of FIG. 4, the split bitmap 422 of Map 2 420 indicates that grains A and C are located on the source disk (Disk 1 405) and grains F and D are located on the target disk (Disk 2 410). Moreover, the difference bitmap 424 of Map 2 420 indicates that there is no difference between the first, third and fourth grain of the source disk (disk one 405) and the target disk (disk two 410). That is, the first, third and fourth grain remain the same between the source disk and the target disk, i.e., A, C and D, respectively. However, the difference bitmap 424 of Map 2 420 indicates that there is a difference for the second grain between the source disk (Disk 1 405) and the target disk (Disk 2 410). That is, as shown in FIG. 4, the second grain has been changed from B on Disk 1 405 to F on Disk 2 410. Thus pointers 425 illustrate that the target disk 410 refers to the source disk 405 based on the contents of the split bitmap 420 rather than to the physical contents of Disk 2 410. Advantageously, according to the prior art, the use of bitmaps 422 424 allows the storage controller 108 to manage access to virtual and physical copies of storage disk volumes, including management of the data content when copies are added or deleted from the system. When a copy is deleted from the chain, the contents representing data updates can be cleaned onto another copy in the remaining chain, based on the contents of the bitmaps 422, 424.

FIGS. 5a-5d depict a method for recovering from a disk corruption.

Figure 5B:
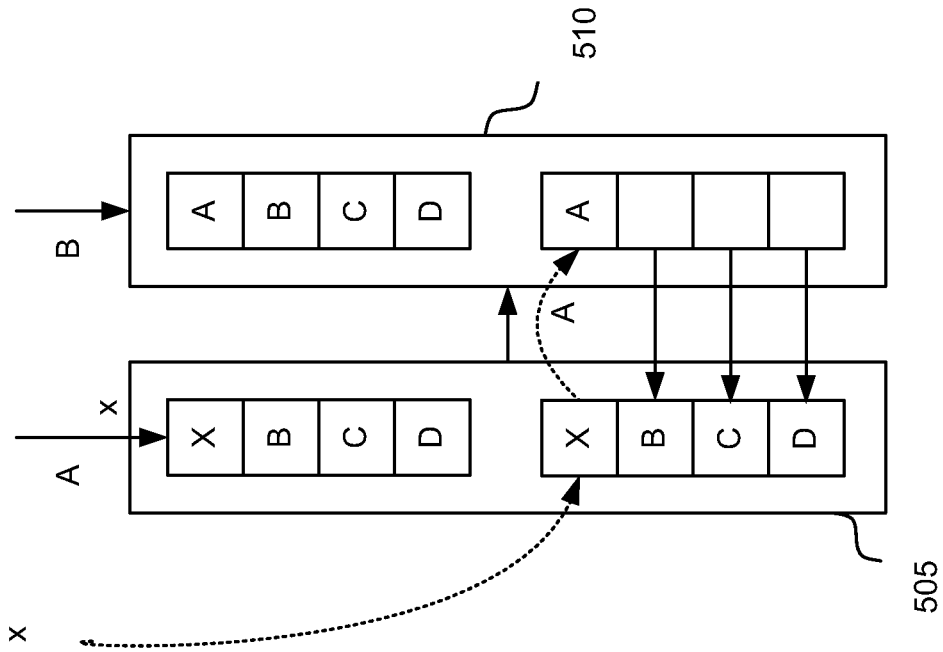
Figure 5A:
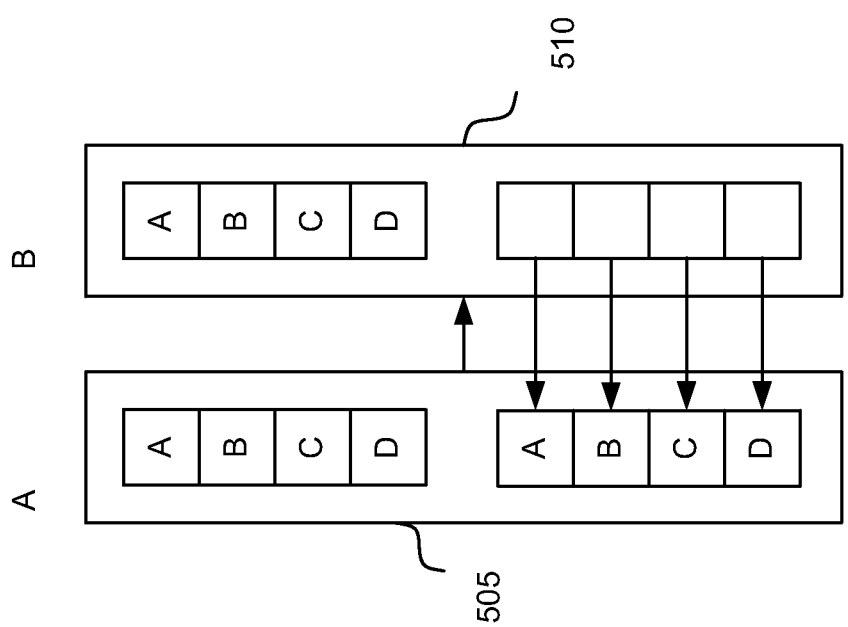

FIG. 5a depicts a source disk A 505, and snapshot copy target disk B 510, each having four grains of data. As in FIG. 4, the upper four grains of each disk 505, 510 depict the data as presented to a host, and the lower four grains of each disk 505, 510 depict the data as actually on the physical disk. FIG. 5a depicts the situation immediately after the disk B 510 snapshot has been made. Disk B 510 presents data (A, B, C, D) to a host, but refers to disk A 505 for the actual physical contents.

FIG. 5b depicts a state when a host writes X to a first grain of source disk A 505. Using the copy-on-write algorithm, the storage controller 108 copies the contents A of the first grain of source disk A 505 to the first grain of target disk B 510. Next, the first grain of source disk A 505 is overwritten with data X. Disk A 505 presents data (X, B, C, D) to a host. Disk B 510 presents data (A, B, C, D) to a host, but Disk B 510 refers to disk A 505 for the actual physical contents of the $2^{nd}$, $3^{rd}$ and $4^{th}$ grains.

FIG. 5c depicts a state when a corruption is identified in disk A 505. Previous writes to the grains of disk A 505 have resulted in copy-on-write operations to populate the grains of disk B 510 with (A, B, C, D). The storage controller 108 initiates a recovery of source disk 505 from the snapshot copy target disk B 510. A logical source disk A(primary) 515 is inserted into the mapping as depicted in FIG. 5c, as a snapshot of target disk B 510. Logical source disk A(primary) 515 is available immediately as source disk A to a host. Logical source disk A(primary) 515 is designated "primary" to signify that a host will direct I/O operations to it. Source disk A(secondary) 505 is designated "secondary" to signify that host I/O operations are not directed at it. Disk A(primary) 515 presents data A, B, C, D to a host, but refers to disk B 510 for the actual physical contents. FIGS. 5c and 5d depict logical constructions, but in reality, the physical contents of Disk A(secondary) 505 and Disk A(primary) 515 represent the same physical device.

FIG. 5d depicts the operation to recover Disk A 505, 515. The grains on Disk B 510 are copied back to the respective grains on Disk A 505, 515. Disk A 515 is now deleted from the mapping, so that the state reverts to that of FIG. 5a. Host I/O operations to Disk A are directed at Disk A 505.

U.S. Pat. No. 8,688,937B2 adds to U.S. Pat. No. 7,386,695B2 with functionality to restore to the source volume from any point-in-time copy without sacrificing any of the point-in-time copies and while keeping the data movement required to complete the restore to a minimum, and while keeping the additional I/O operations required to maintain all the volumes while the restore is ongoing bounded, independently of the number of volumes.

FIG. 6a depicts source disk G 655, with point-in-time copies U2 665 and U1 660, taken in order U1 660 and U2 665. This is depicted in the dependency chain graph of FIG. 6b. FIG. 6c also depicts the dependency graph of FIG. 6b in more detail.

Typically, source disk G 655 represents a "golden" image that will not be changed. In an exemplary embodiment, snapshot point-in-time copies U1 660 and U2 665 are made for different users. Such a configuration may be used by an organization that has, for example, a standard set tools that multiple users have access to. The data presented to a host is (A, B, C, D).

Snapshot point-in-time copy U1 660 is used by a first user (not depicted). The first user carries out host I/O operations to point-in-time copy U1 660, writing data "X" to the second grain 680 of the physical disk of U1 660.

Snapshot point-in-time copy U2 665 is used by a second user (not depicted). U2 665 is depicted in the mapping of FIGS. 6b and 6c as object U2 665. The second user carries out host I/O operations to point-in-time copy U2 665, writing data "Y" to the third grain 685 of the physical disk of U2 665. As U2 665 is a snapshot point-in-time copy of source disk G 655, the first, second and fourth 690 grains are empty, so host I/O reads to U2 665 refer to the respective grains of the source disk G 655. The data presented to a host is (A, B, Y, D).

As the volumes are being managed in a cascade configuration, when data "Y" is written to the third grain 685 of physical disk of U2 665, the contents of the third grain of the physical disk of G 655, data "C", is written to the corresponding third grain of the physical disk of U1 660. U1 660 is a snapshot point-in-time copy of source disk G 655, so the first, and fourth grains are empty, so host I/O reads to U1 660 refer to the respective grains of the source disk G 655 as depicted by arrows between respective grains, for example, arrow 695, via the cascade G→U2→U2-S1→U1. The data presented to a host for U1 660 is (A, X, C, D).

Snapshot point-in-time copy U2-S1 667 is made of point-in-time copy U2 665 after data "Y" has been written. U2-S1 667 is depicted in the mapping of FIGS. 6b and 6c as object U2-S1 667. Without any host I/O writes, as U2 665 is a snapshot point-in-time copy of source disk G 655, with all grains empty, so host I/O reads to the first, second and fourth 690 grains of U2-S1 667 refer to the respective grains of the source disk G 655, and host I/O reads to the third grain of U2-S1 667 refers to the third grain 685 of U2 665. The data presented to a host is (A, B, Y, D).

If a volume is corrupted in some way by host I/O operations, restoration is made from any of the point-in-time copies. For example, U2 665 is the most recent point-in-time copy of golden image source volume G 655, but it may not be known when the corruption occurred and if the corruption exists on one of the point-in-time copies. Mounting one of the point-in-time copies to the host system in order to test out the copy can be a very expensive task.

Figure 7:
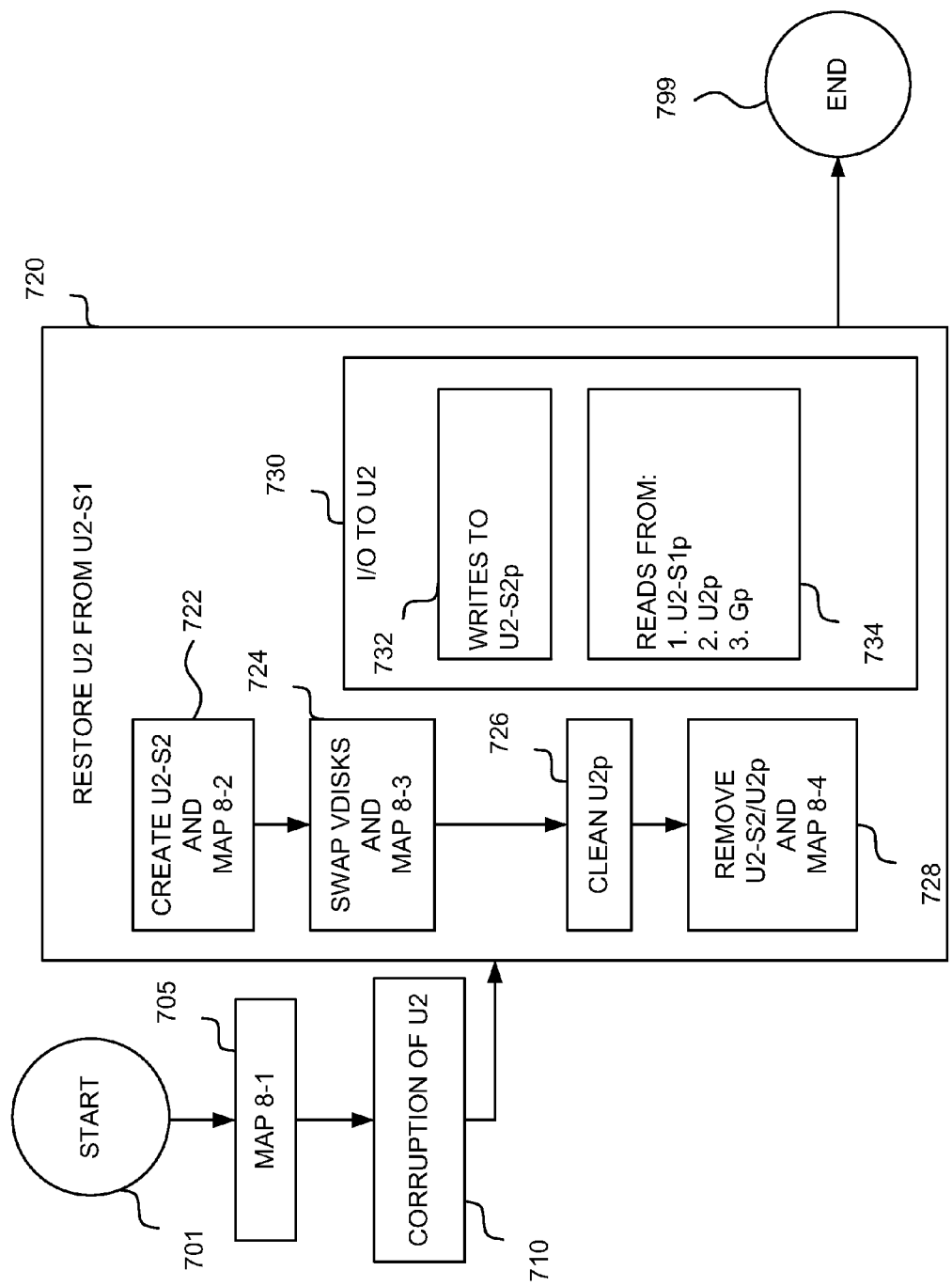
FIG. 7 depicts a method to restore a snapshot point-in-time volume from a snapshot point-in-time copy, in accordance with an exemplary embodiment of the present invention.
Figure 8:
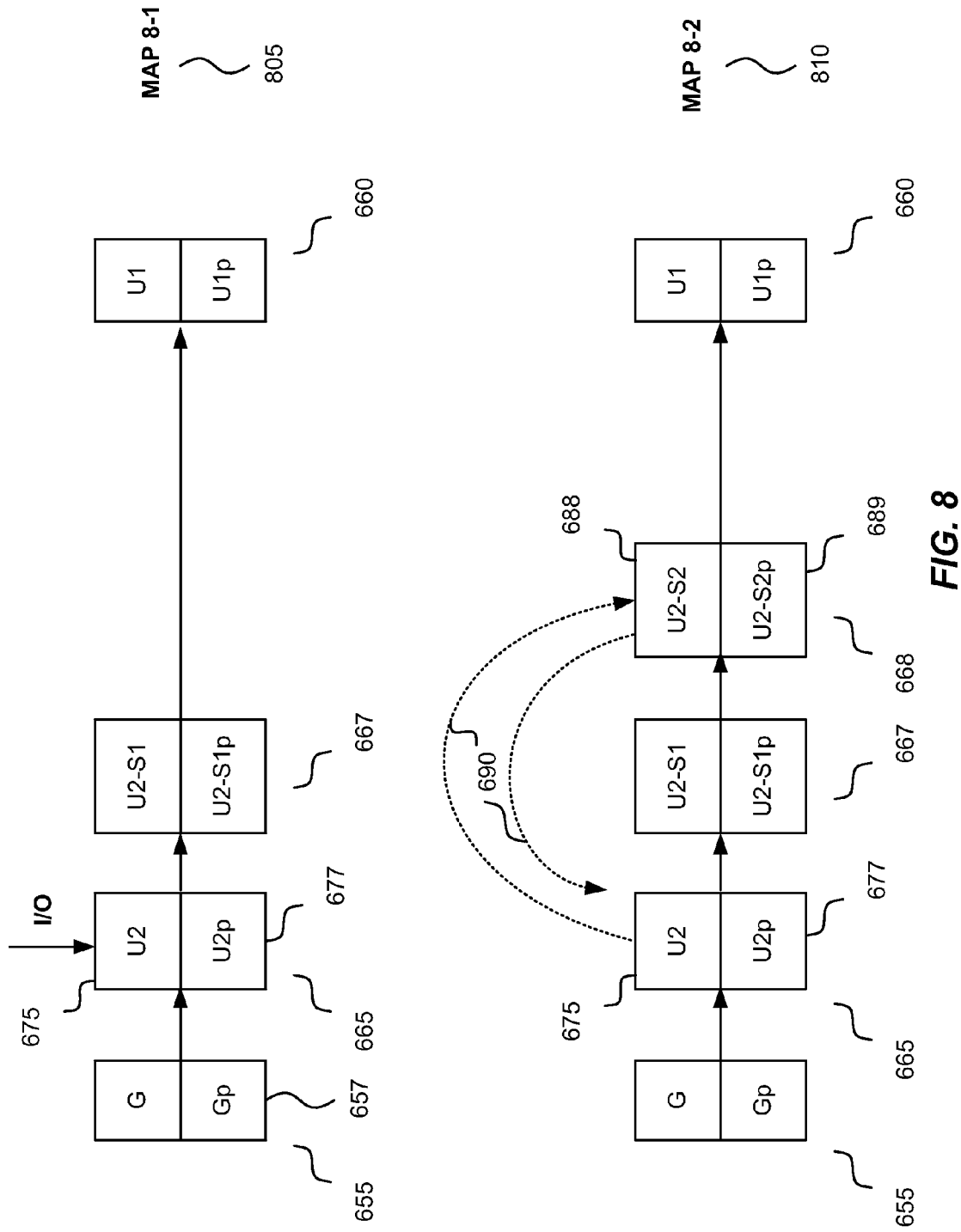
FIG. 8 depicts mappings used in recovery of a snapshot, in accordance with an exemplary embodiment of the present invention.
Figure 8:
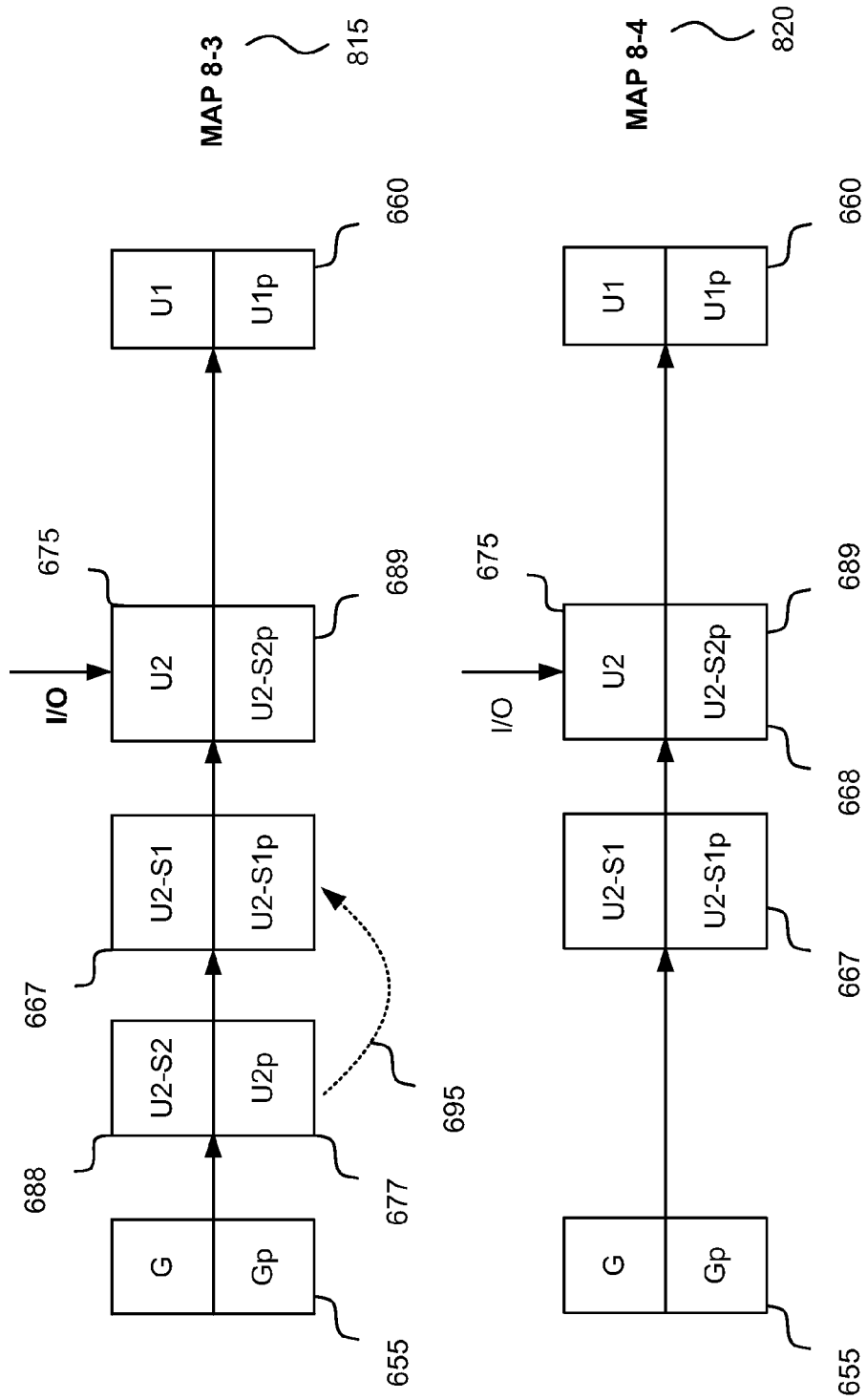
Figure 9:
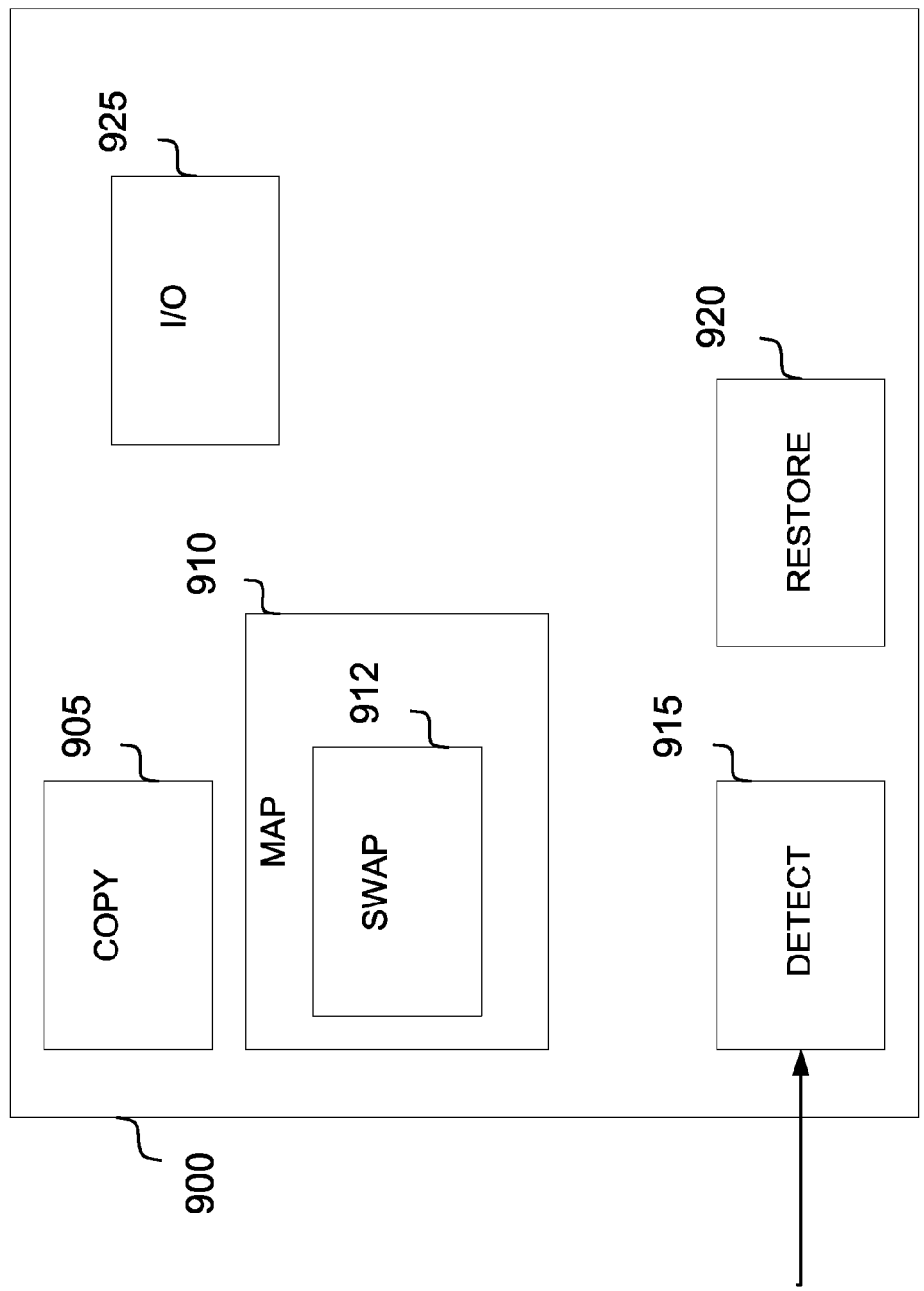
FIG. 9 depicts components of restoration system, in accordance with an exemplary embodiment of the present invention.

FIG. 7, which should be read in conjunction with FIGS. 8 and 9, depicts a method of restoring a snapshot point-in-time volume from a snapshot point-in-time copy, in accordance with an exemplary embodiment of the present invention. FIG. 8 depicts mappings used in the recovery of a snapshot, in accordance with an exemplary embodiment of the present invention, first introduced in FIG. 6, but with respective vdisks and pdisks depicted. FIG. 9 depicts components of restoration system 900, which, in an exemplary embodiment, is a component of storage controller 108. In an alternative embodiment, restoration system 900 is provided separately from the storage controller 108.

The method starts at step 701. At step 705, copy component 905 creates copies U1 660 and U2 665. An I/O component 925 writes data "X" to the second grain 680 of U1 660. The I/O component 925 writes data "Y" to the third grain 685 of U2 665. The copy component 905 creates snapshot point-in-time copy U2-S1 667 of U2 665. The map component 910 creates Map 8-1 805. The I/O component 925 carries out host I/O operations to U2665, based on the contents of pdisk U2p 677 and Gp 657. I/O component 925 makes host reads from U2 665 from U2p 677 and Gp 657, based on the respective bitmaps 422, 424. The I/O component 925 makes host writes directed at U2 665 to U2p 677.

At step 710, the I/O component 925 writes data to U2665. The data write comprises a copy-on-write operation from U2 665 to snapshot point-in-time copy U2-S1 667. A detect component 915 identifies a corruption of snapshot point-in-time copy disk U2 665, for example by host I/O.

At step 720, restore component 920 starts restoration of U2 665 from U2-S1 667. The copy component 905 creates snapshot point-in-time copy U2-S2 668 as a snapshot point-in-time copy of snapshot point-in-time copy U2-S1 667. At step 722, the map component 910 creates temporary Map 8-2 810. At step 724, a swap component 912 swaps 690 the vdisk host portion 675 of U2 665 with the vdisk host portion 688 of U2-S2 668. The map component 910 creates Map 8-3 815.

As described by the process with respect to FIGS. 5a-5d, at step 730, the I/O component 925 carries out host I/O operations directed at U2 665 to vdisk U2 675 with corresponding pdisk U2-S2p 689. I/O component 925 makes host reads 734 directed at U2 665 from U2-S1p, uncorrupted grains in U2p 677, Gp 657 and any written grains of U2-S2p 689, based on the respective bitmaps 422, 424. The I/O component 925 makes host writes 732 directed at U2 665, to U2-S2p 689. Advantageously, at this point no extra physical storage has been used apart from any initial metadata required for the snapshot volume U2-S2 668. Advantageously, a host can now start using vdisk U2 675 immediately in its restored state.

In parallel with step 730, at step 726, the restore component 920 carries out restoration to U2-S2p 689 from pdisk U2p 677 for grains not overwritten by host writes to U2-S2p 689: snapshot point-in-time copy volume U2-S2 688/U2p 677 is stopped; uncorrupted grains of U2p 677 are cleaned, or recovered 695, to U2-S 1p.

After all uncorrupted data is recovered, at step 728 the copy component 905 removes the snapshot point-in-time copy U2-S2 688/U2p 677. Advantageously, once removed the physical storage consumed will be not greater than prior to the restore (excluding any host IO that occurred after the restore). Multiple restores can occur without waiting for any background process to occur. The map component creates Map 8-4 820.

In an alternative embodiment, the point-in-time copy volumes are clone point-in-time copy volumes.

The method ends at step 799.

Advantageously, once the method is complete, the data that was previously on corrupted volume U2 665 is completely restored to a host, from snapshot point-in-time copy volumes U2-S1 667 and U2-S2 675/U2-S2p 688. The contents of U2 655 before the corruption do not need to be entirely recovered to U2-S2 675/U2-S2p 688, because the data can be recovered to U2-S1 667 in the cascade. There is no need to completely replicate the contents of the different snapshot point-in-time copies, because, through the use of snapshot point-in-time copies, the restored data is presented correctly to the host.

In an alternative embodiment of the present invention an administrator chooses to start the method without an actual detect, for example, to test out the system.

Advantageously, the vdisk portion handles the host I/O and point-in-time copy processing, whereas the pdisk portion stores the data. Advantageously, according to an exemplary embodiment of the present invention, a split is introduced between the logical image presented by the host and managed by the point-in-time copy algorithm and the physical storage used to hold the data. Each storage volume comprises a vdisk portion and a pdisk portion. The vdisk portion is considered as the host portion. The vdisk portion handles the host I/O and point-in-time processing, and the pdisk stores the data. Advantageously, the system can always roll forward restore operations at the user's request and tidy up abandoned restores in the background.

Advantageously, at the point a recovery snapshot is created, no extra physical storage has been used apart from any initial metadata required for the new snapshot volume. Advantageously, a host can start using the required snapshot immediately in its restored state. Advantageously, once removed the physical storage consumed will be not greater than prior to the restore (excluding any host IO that occurred after the restore). Clearly, multiple restores can occur without waiting for any background process to occur.

Advantageously, once the method is complete, the data that was previously on the corrupted volume is completely restored to a host, from the available snapshot point-in-time copy volumes U2-S1 There is no need to completely replicate the contents of the different snapshot point-in-time copies, because through the use of snapshot point-in-time copies the restored data is presented correctly to the host.

Figure 10:
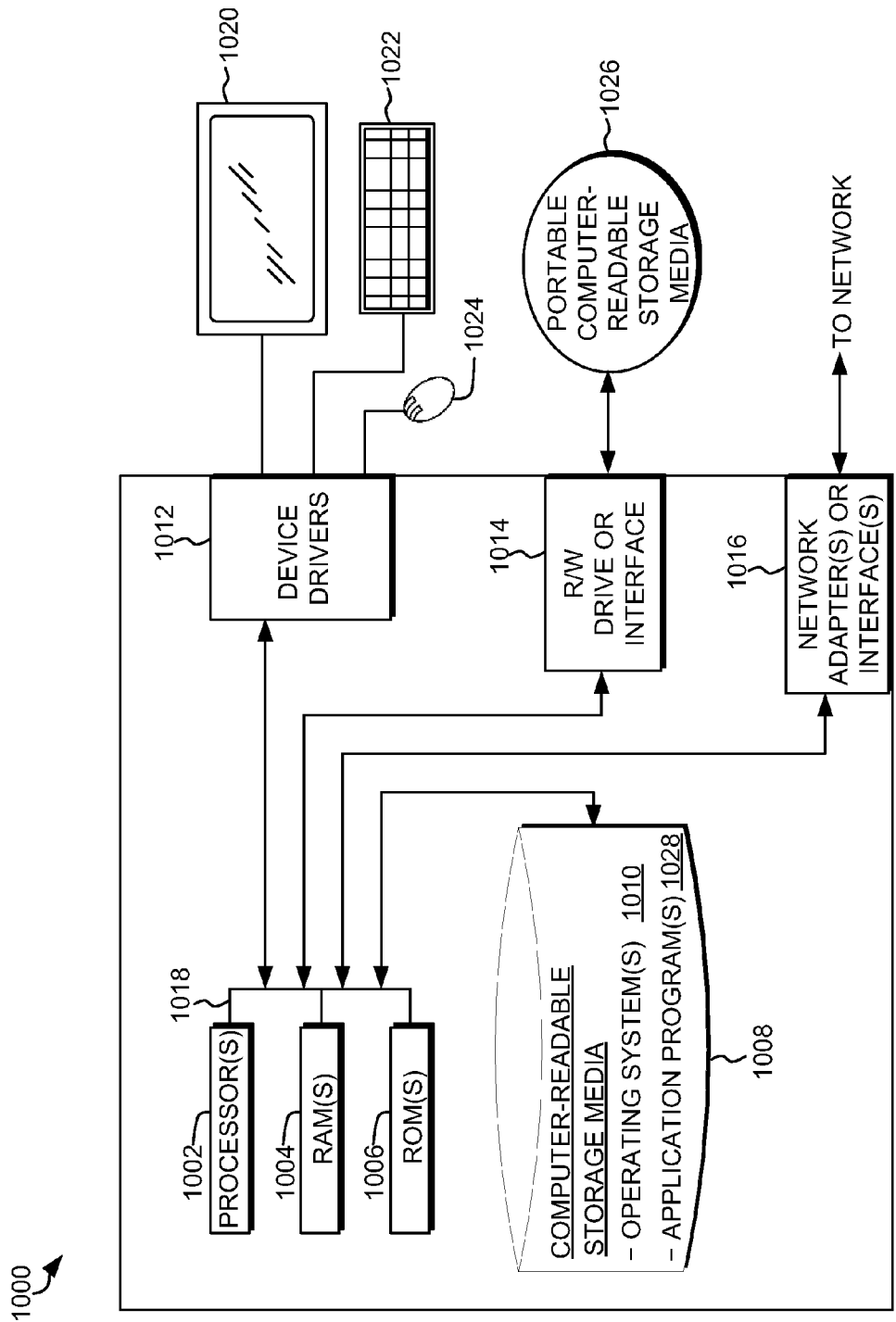
FIG. 10 is a functional block diagram illustrating a data processing environment, in accordance with an embodiment of the present invention.

FIG. 10 depicts a block diagram of components of a computing device 1000 capable of performing the computing operations described herein, in accordance with an embodiment of the present invention. It should be appreciated that FIG. 10 provides only an illustration of one implementation and does not imply any limitations with regard to the environments in which different embodiments may be implemented. Many modifications to the depicted environment may be made.

Computing device 1000 may include one or more processors 1002, one or more computer-readable RAMs 1004, one or more computer-readable ROMs 1006, one or more computer readable storage media 1008, device drivers 1012, read/write drive or interface 1014, network adapter or interface 1016, all interconnected over a communications fabric 1018. Communications fabric 1018 may be implemented with any architecture designed for passing data and/or control information between processors (such as microprocessors, communications and network processors, etc.), system memory, peripheral devices, and any other hardware components within a system.

One or more operating systems 1010, and one or more application programs 1028, for example, restoration system 900, are stored on one or more of the computer readable storage media 1008 for execution by one or more of the processors 1002 via one or more of the respective RAMs 1004 (which typically include cache memory). In the illustrated embodiment, each of the computer readable storage media 1008 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 1000 may also include a R/W drive or interface 1014 to read from and write to one or more portable computer readable storage media 1026. Application programs 1028 on client computing devices and/or computing device 1000 may be stored on one or more of the portable computer readable storage media 1026, read via the respective R/W drive or interface 1014 and loaded into the respective computer readable storage media 1008.

Computing device 1000 may also include a network adapter or interface 1016, such as a TCP/IP adapter card or wireless communication adapter (such as a 4G wireless communication adapter using OFDMA technology). Application programs 1028 on computing device 1000 may be downloaded to the computing device from an external computer or external storage device via a network (for example, the Internet, a local area network or other wide area network or wireless network) and network adapter or interface 1016. From the network adapter or interface 1016, the programs may be loaded onto computer readable storage media 1008. The network may comprise copper wires, optical fibers, wireless transmission, routers, firewalls, switches, gateway computers and/or edge servers.

Computing device 1000 may also include a display screen 1020, a keyboard or keypad 1022, and a computer mouse or touchpad 1024. Device drivers 1012 interface to display screen 1020 for imaging, to keyboard or keypad 1022, to computer mouse or touchpad 1024, and/or to display screen 1020 for pressure sensing of alphanumeric character entry and user selections. The device drivers 1012, R/W drive or interface 1014 and network adapter or interface 1016 may comprise hardware and software (stored on computer readable storage media 1008 and/or ROM 1006).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
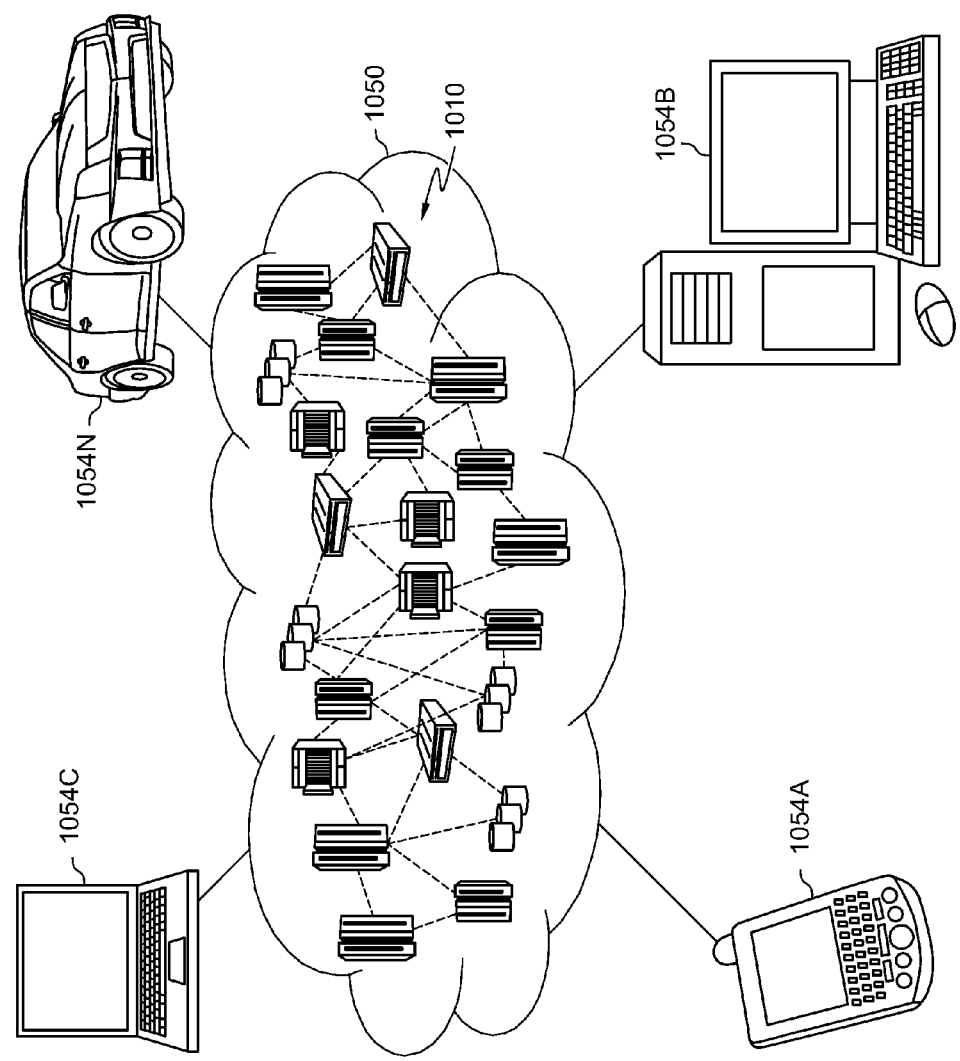
FIG. 11 depicts a cloud computing environment, in accordance with an embodiment of the present invention.

Referring now to FIG. 11, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 11 are intended to be illustrative only and that computing nodes 1010 and cloud computing environment 1050 can communicate with any type of computerized device over any type of network and/or network addressable connection (e.g., using a web browser).

Figure 12:
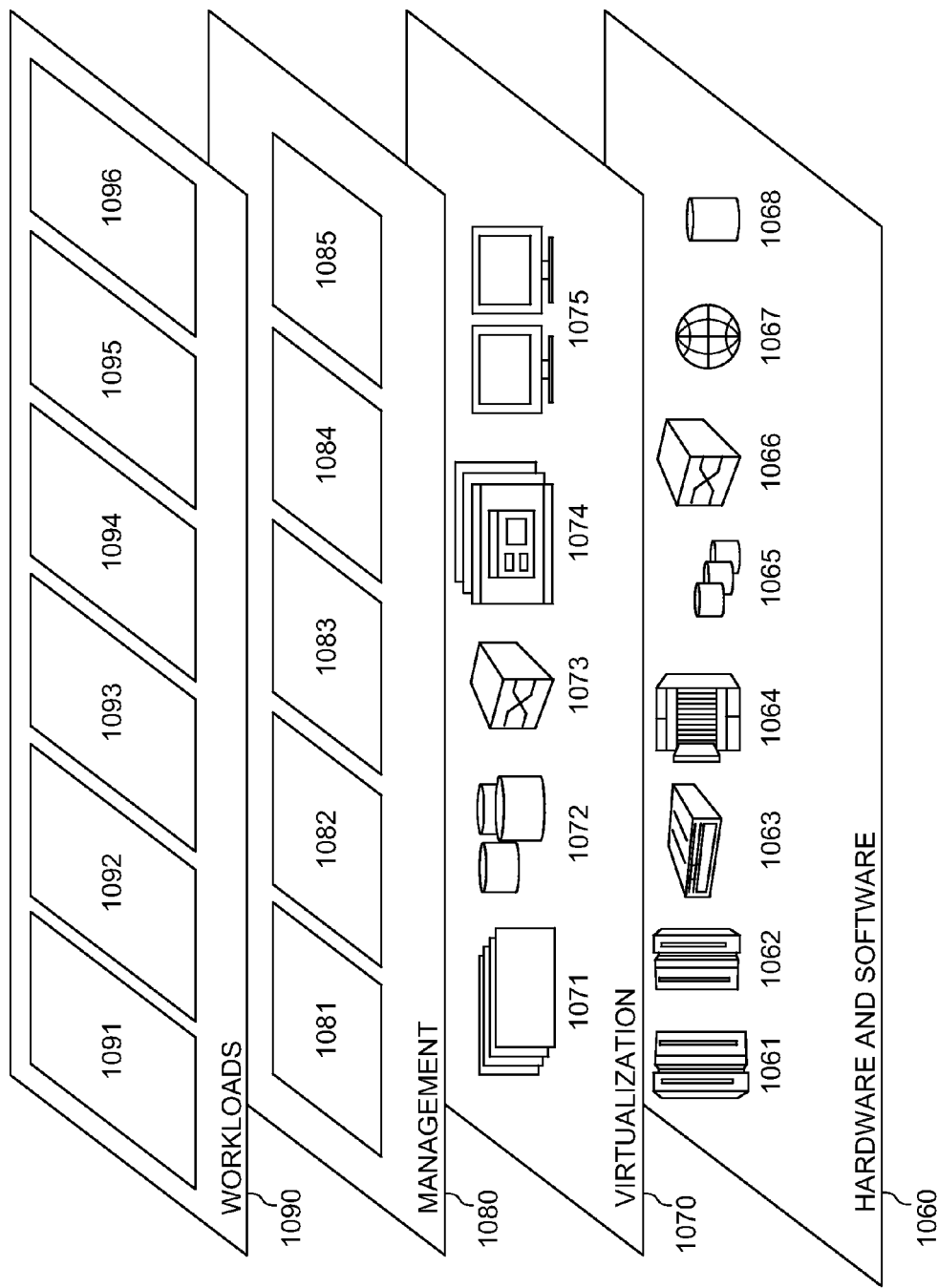
FIG. 12 depicts abstraction model layers, in accordance with an embodiment of the present invention.

Referring now to FIG. 12, a set of functional abstraction layers provided by cloud computing environment 1050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and restoration system 900 processing 1272 of an embodiment of the present invention. Alternatively, restoration system 900 processing 1252 can be carried out at the management layer 1080.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for managing storage volumes in a point-in-time copy cascade, wherein the cascade comprises a first source volume, a first point-in-time target volume, and a second point-in-time target volume, wherein the second point-in-time target volume is a point-in-time copy of the first point-in-time target volume, the method comprising:
   detecting, by a computer, a corruption of the first point-in-time target volume; then:
      creating, by the computer, a third point-in-time target volume from the second point-in-time target volume;
      directing, by the computer, I/O operations for the first point-in-time target volume to the third point-in-time target volume;
      restoring, by the computer, the first point-in-time target volume to the second point-in-time target volume; and
      in response to the restoration completing, deleting, by the computer, the first point-in-time target volume.

2. A method in accordance with claim 1, wherein each volume comprises a host portion, the method further comprising:
   in response to the creation of the third point-in-time target volume, swapping, by the computer, the host portion of the third point-in-time target volume with the host portion of the first point-in-time target volume.

3. A method in accordance with claim 1, further comprising:
   in response to the creation of the third point-in-time target volume, adding, by the computer, the third point-in-time target volume to the cascade; and
   in response to the deletion of the first point-in-time target volume, deleting, by the computer, the first point-in-time target volume from the cascade.

4. A method in accordance with claim 1, wherein the target volumes are snapshot point-in-time copy volumes.

5. A computer program product for managing storage volumes in a point-in-time copy cascade, wherein the cascade comprises a first source volume, a first point-in-time target volume, and a second point-in-time target volume, wherein the second point-in-time target volume is a point-in-time copy of the first point-in-time target volume, the computer program product comprising:
   one or more computer-readable storage media and program instructions stored on the one or more computer-readable storage media, the program instructions, when executed by a computer, cause the computer to perform a method comprising:
   detecting a corruption of the first point-in-time target volume; then:
      creating a third point-in-time target volume from the second point-in-time target volume;
      directing I/O operations for the first point-in-time target volume to the third point-in-time target volume;
      restoring the first point-in-time target volume to the second point-in-time target volume; and
      in response to the restoration completing, deleting the first point-in-time target volume.

6. A computer program product in accordance to claim 5, wherein each volume comprises a host portion, the method further comprising:
   in response to the creation of the third point-in-time target volume, swapping the host portion of the third point-in-time target volume with the host portion of the first point-in-time target volume.

7. A computer program product in accordance to claim 5, the method further comprising:
   in response to the creation of the third point-in-time target volume, adding the third point-in-time target volume to the cascade; and in response to the deletion of the first point-in-time target volume, deleting the first point-in-time target volume from the cascade.

8. A computer program product in accordance to claim 5, wherein the target volumes are snapshot point-in-time copy volumes.

9. A computer system for managing storage volumes in a point-in-time copy cascade, wherein the cascade comprises a first source volume, a first point-in-time target volume, and a second point-in-time target volume, wherein the second point-in-time target volume is a point-in-time copy of the first point-in-time target volume, the computer system comprising:
   one or more computer processors, one or more computer-readable storage media, and program instructions stored on one or more of the computer-readable storage media, which when executed cause the one or more processors to perform a method comprising:
   detecting a corruption of the first point-in-time target volume; then:
      creating a third point-in-time target volume from the second point-in-time target volume;
      directing I/O operations for the first point-in-time target volume to the third point-in-time target volume;
      restoring the first point-in-time target volume to the second point-in-time target volume; and
      in response to the restoration completing, deleting the first point-in-time target volume.

10. A computer system in accordance to claim 9, wherein each volume comprises a host portion, the method further comprising:
   in response to the creation of the third point-in-time target volume, swapping the host portion of the third point-in-time target volume with the host portion of the first point-in-time target volume.

11. A computer system in accordance to claim 9, the method further comprising:
   in response to the creation of the third point-in-time target volume, adding the third point-in-time target volume to the cascade; and
   in response to the deletion of the first point-in-time target volume, deleting the first point-in-time target volume from the cascade.

12. A computer system in accordance to claim 9, wherein the target volumes are snapshot point-in-time copy volumes.

\* \* \* \* \*